US010815795B2

(12) United States Patent
Ganiger et al.

(10) Patent No.: US 10,815,795 B2
(45) Date of Patent: Oct. 27, 2020

(54) PRE-TENSION AND RETENTION STRUCTURE FOR COMPOSITE FAN BLADE

(71) Applicant: General Electric Company, Schenectady, NY (US)

(72) Inventors: Ravindra Shankar Ganiger, Bangalore (IN); Viswanadha Gupta Sakala, Bangalore (IN); Nicholas Joseph Kray, Mason, OH (US)

(73) Assignee: General Electric Company, Schenectady, NY (US)

(*) Notice: Subject to any disclaimer, the term of this patent is extended or adjusted under 35 U.S.C. 154(b) by 68 days.

(21) Appl. No.: 16/226,756

(22) Filed: Dec. 20, 2018

(65) Prior Publication Data

US 2020/0200018 A1   Jun. 25, 2020

(51) Int. Cl.
| | | |
|---|---|---|
| F01D 5/28 | (2006.01) | |
| F04D 29/38 | (2006.01) | |
| F01D 5/18 | (2006.01) | |
| F01D 5/14 | (2006.01) | |
| F04D 29/02 | (2006.01) | |
| F04D 29/32 | (2006.01) | |
| B64C 11/24 | (2006.01) | |

(52) U.S. Cl.
CPC ........... *F01D 5/282* (2013.01); *F04D 29/388* (2013.01); *B64C 11/24* (2013.01); *F01D 5/147* (2013.01); *F01D 5/18* (2013.01); *F04D 29/023* (2013.01); *F04D 29/324* (2013.01); *F05D 2300/614* (2013.01)

(58) Field of Classification Search
CPC .......... F01D 5/147; F01D 5/18; F04D 29/023; F04D 29/324; F04D 29/388; B64C 11/24; F05D 2300/614
See application file for complete search history.

(56) References Cited

U.S. PATENT DOCUMENTS

| | | | | |
|---|---|---|---|---|
| 1,488,243 | A * | 3/1924 | Haw | B64C 11/20 416/88 |
| 2,660,252 | A * | 11/1953 | Doussain | B64C 11/06 416/134 R |
| 2,843,355 | A | 7/1958 | Findley | |
| 2,919,889 | A * | 1/1960 | Rubel | F01D 5/282 416/140 |
| 3,756,746 | A | 9/1973 | Baker | |
| 3,844,728 | A | 10/1974 | Copley et al. | |
| 4,029,434 | A * | 6/1977 | Kenney | B64C 11/06 416/41 |
| 4,071,184 | A | 1/1978 | Carlson et al. | |
| 4,285,634 | A | 8/1981 | Rossman et al. | |
| 5,344,686 | A | 9/1994 | Heubert | |

(Continued)

*Primary Examiner* — Igor Kershteyn
(74) *Attorney, Agent, or Firm* — General Electric; Kristi Davidsom

(57) ABSTRACT

A blade for a propulsion apparatus that includes a body formed of a first material. The body includes opposed pressure and suction sides and extends in span between a root and a tip. The body extends in court between a leading edge and a trailing edge. A tension element is positioned within the body and extends between the root and the tip. The tension element includes at least one string that is configured to be under tension such that at least a portion of the blade between the root and the tip is under compression.

18 Claims, 9 Drawing Sheets

(56) References Cited

U.S. PATENT DOCUMENTS

| | | | |
|---|---|---|---|
| 8,142,163 B1* | 3/2012 | Davies | F01D 5/147 |
| | | | 416/225 |
| 8,475,132 B2* | 7/2013 | Zhang | F01D 5/284 |
| | | | 416/225 |
| 8,496,438 B2* | 7/2013 | Lafont | B64C 11/06 |
| | | | 416/204 A |
| 8,845,292 B2* | 9/2014 | Lafont | F04D 29/322 |
| | | | 416/204 R |
| 9,243,512 B1* | 1/2016 | Zatorski | F01D 21/045 |
| 9,579,714 B1 | 2/2017 | Rutkowski | |
| 9,605,364 B2 | 3/2017 | Godon et al. | |
| 9,784,111 B2 | 10/2017 | Luo et al. | |
| 9,828,862 B2 | 11/2017 | Zatorski et al. | |
| 2011/0091326 A1* | 4/2011 | Hancock | F03D 1/0675 |
| | | | 416/225 |

\* cited by examiner

PRE-TENSION AND RETENTION STRUCTURE FOR COMPOSITE FAN BLADE

BACKGROUND OF THE INVENTION

This invention relates to turbofan blades formed of composite material and structures for strengthening and reinforcing such composite blades.

A typical composite fan blade includes reinforcing fibers embedded in a matrix (e.g. carbon fibers in epoxy). Such composite fan blades generally have a brittle failure characteristic such that a failure can occur under low strain relative to blades of other materials such as metal alloys.

A gas turbine engine includes a turbomachinery core having a high-pressure compressor, a combustor, and a high-pressure turbine in a serial flow relationship. The core is operable in a known manner to generate a primary flow of propulsive gas. A typical turbofan engine adds a low-pressure turbine driven by the core exhaust gases which in turn drives a fan rotor through a shaft to generate a bypass flow of propulsive gas. In the case of a high bypass engine this provides the majority of the total engine thrust.

The fan rotor includes a fan that includes an array of fan blades extending radially outward from a fan disk. The fan blades are positioned radially inward of a shroud and are configured to clear the shroud during normal operating conditions. However, during operation of the engine, a portion of a fan blade may contact the shroud and fail. As a result, a blade may fracture or separate into multiple fragments. The fragments can then cause more damage.

Thus one problem with conventional composite blades is that they are brittle and subject to separation into fragments, and when they do break into fragments, the fragments can loosely move about the engine and cause significant further damage.

BRIEF DESCRIPTION OF THE INVENTION

This problem is addressed by providing reinforcement that comprises "strings" (similar to cables) made of a material that has a greater tensile strength than the basic composite material of the blade and that also has ductile failure characteristics. Suitable materials for the strings include some types of carbon fiber, alloys such as steel, or shape memory alloys ("SMA"). Thus the present invention provides for strengthening composite blades thereby restraining fragments that are produced during a failure and reducing the number of fragments that can move about an engine and cause damage.

According to one aspect, a blade for a propulsion apparatus that includes a body formed of a first material. The body includes opposed pressure and suction sides and extends in span between a root and a tip. The body extends in court between a leading edge and a trailing edge. A tension element is positioned within the body and extends between the root and the tip. The tension element includes at least one string that is configured to be under tension such that at least a portion of the blade between the root and the tip is under compression.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
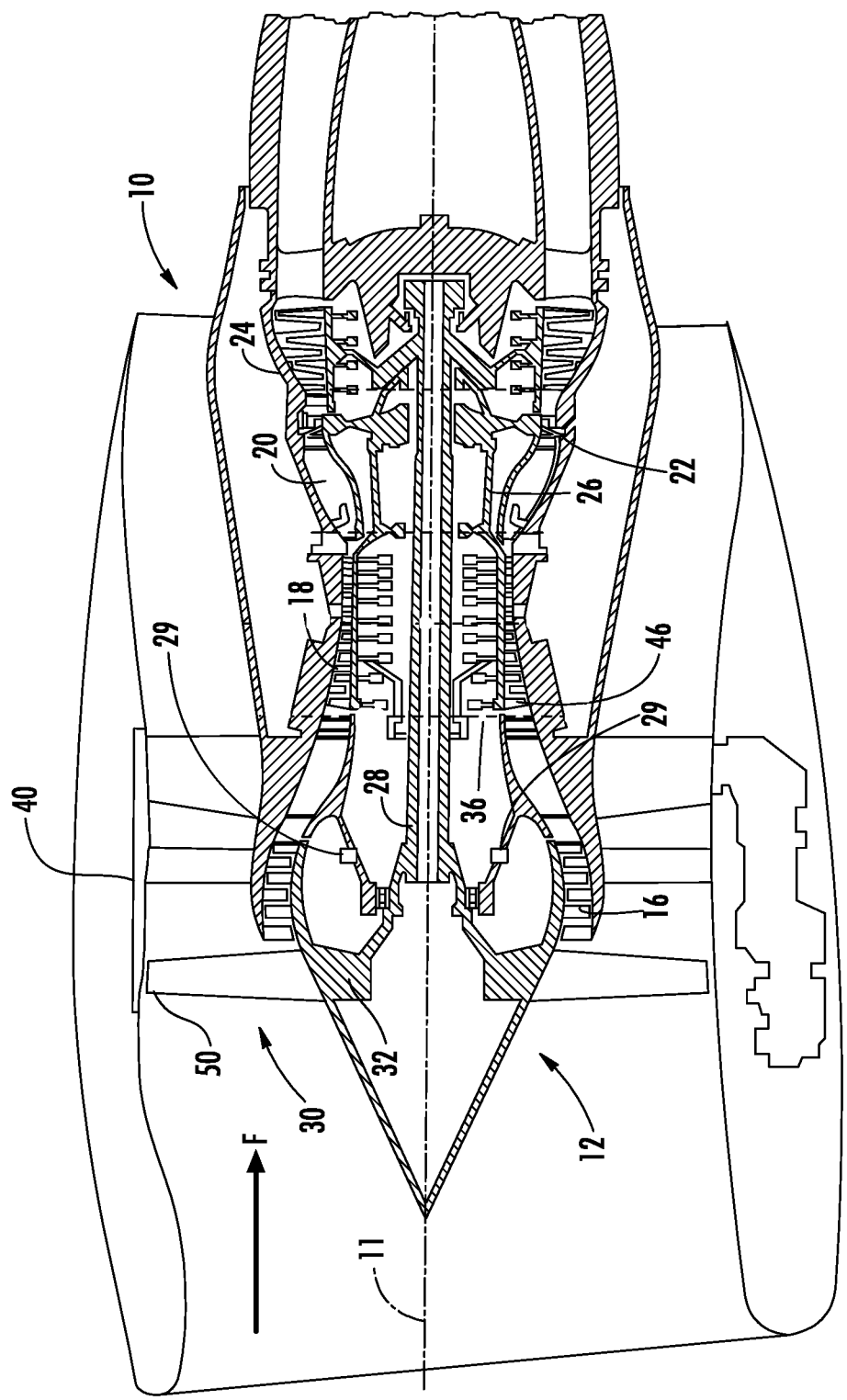
FIG. 1 is a schematic cross-sectional view of a gas turbine engine.

Referring to the drawings wherein identical reference numerals denote the same elements throughout the various views, FIG. 1 depicts an exemplary gas turbine engine 10 that includes a propulsion apparatus. While the illustrated example is a high-bypass turbofan engine, the principles of the present invention are also applicable to other types of engines, such as low-bypass turbofans, turbojets, turboprops, etc. The engine 10 has a longitudinal center line or axis 11.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 12, booster 16, compressor 18, combustor 20, high pressure turbine or "HPT" 22, and low-pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 12 and booster 16 via an inner shaft 28.

The fan 12 is one example of a propulsion apparatus. It will be understood that the principles described herein are applicable to other kinds of propulsion apparatus operable to produce propulsive thrust, such as ducted propellers or compressors. Instead of a gas turbine engine, the fan 12 or other propulsion apparatus could be driven by another type of prime mover such as: heat engines, motors (e.g. electric, hydraulic, or pneumatic), or combinations thereof (for example electric hybrid drivetrains). The propulsion apparatus may be driven directly by a prime mover, or through an intermediate geartrain.

A plurality of mechanical fuses 29 are positioned mechanically between the fan 12 and the shaft 28. The mechanical fuses 29 are configured to transfer rotational energy from the shaft 28 during normal operation. High radial forces may cause a mechanical fuse 29 to fail thus allowing the fan 12 to rotate about a new axis of rotation. The mechanical fuse 29 is referred to as a load reduction device, or LRD.

Figure 2:
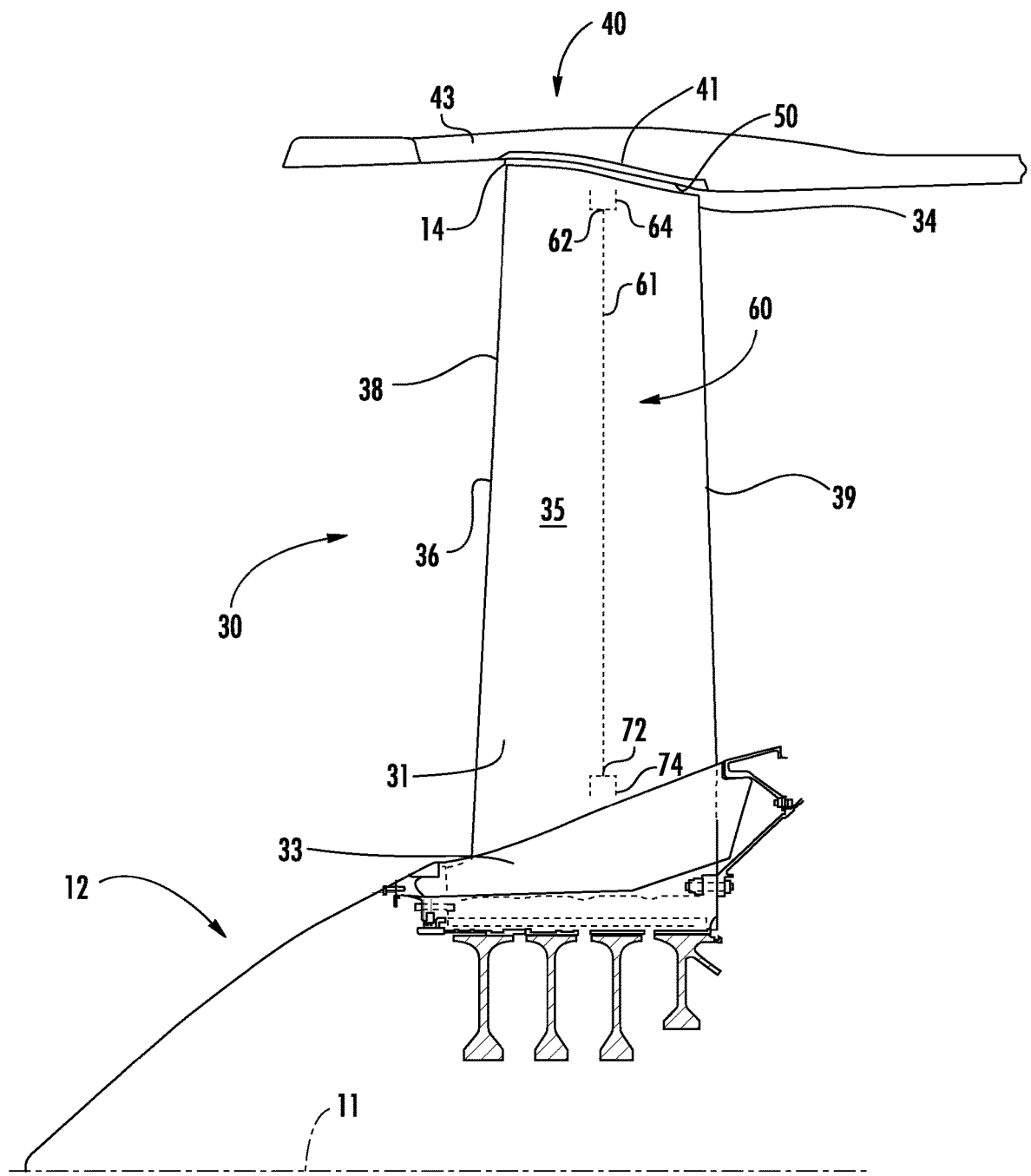
FIG. 2 is an enlarged view of a portion of the gas turbine engine of FIG. 1, showing a fan blade and a portion of a fan hub and shroud.

According to the illustrated embodiment shown in FIG. 2, the fan 12 includes a plurality of fan blades 30. The fan blades 30 are mounted to a fan disk 32 (shown in FIG. 1) and each includes a body 31. Each fan blade extends from a root 33 to a tip 34 and has a pressure side 35, a suction side 36, a leading-edge 38 and a trailing edge 39. The blade 30 is formed of the composite material such as carbon fibers embedded in a polymer matrix.

As shown in FIG. 2, the fan casing 40 includes an inner annular surface 50. The inner annular surface 50 has a generally circular cross-section and defines an inner diameter of the inner casing 40. The inner annular surface 50 is configured to channel the incoming air through the fan 12 so as to ensure that the fan 12 will compress the bulk of the air entering the engine 10. By way of example and not limitation, the fan casing 40 can be made of the following: a metal, a composite material, and a combination thereof.

As shown in FIG. 2, the inner casing 40 includes a thin layer of shroud material 41 positioned adjacent to a blade tip path defined by the blades 30 of the fan 12. The shroud material 41 is supported by a containment structure 43. The containment structure 43 can be configured as a honeycomb structure or as other trench filler material such as that found in conventional fan casing 40.

A small radial gap 14 is present between the tips 34 of the fan blades 30 and the inner annular surface 50. It is this clearance, i.e., the radial gap 14, that is minimized in order to promote the efficiency of the engine 10.

Figure 3:
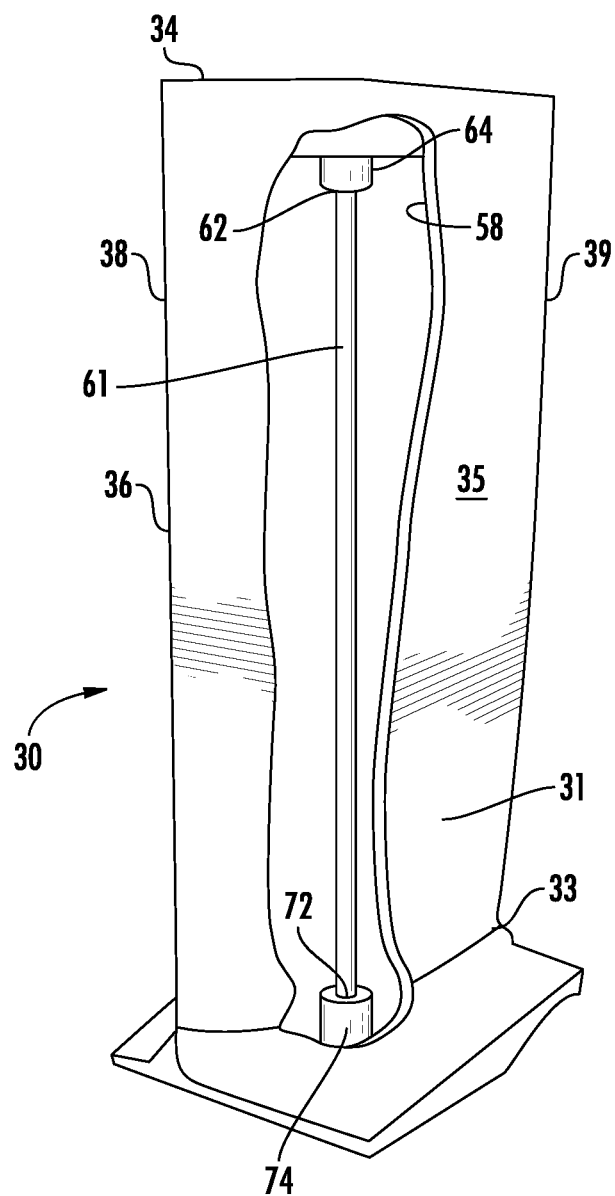
FIG. 3 is a partially cut-away perspective view of a fan blade according to the present invention.

Referring now to FIG. 3, the blade 30 define an interior region 58 that is configured to receive a tension element 60. The interior region 58 can be an open space or void. Alternatively, the interior region 58 can be filled with the compressible material.

The tension element 60 is configured to provide compression within at least a portion of the body 31 between the root 33 and the tip 34. The tension element 60 includes a string 61 that extends between a first end 62 and a second end 72. The string 61 is configured to be placed under tension and can be, by way of example and not limitation, one of the following: a flexible element such as a thread, string, rope or wire, webbing, strut, rod, other flexible stiff or semi-flexible element, and a combination thereof. The first end 62 of the string 61 is connected to a first anchor element 64. The first anchor element 64 is positioned near the tip 34 of the blade 30 and attached to the blade 30 such that the first anchor element is fixedly positioned relative to the tip 34.

Figure 6:
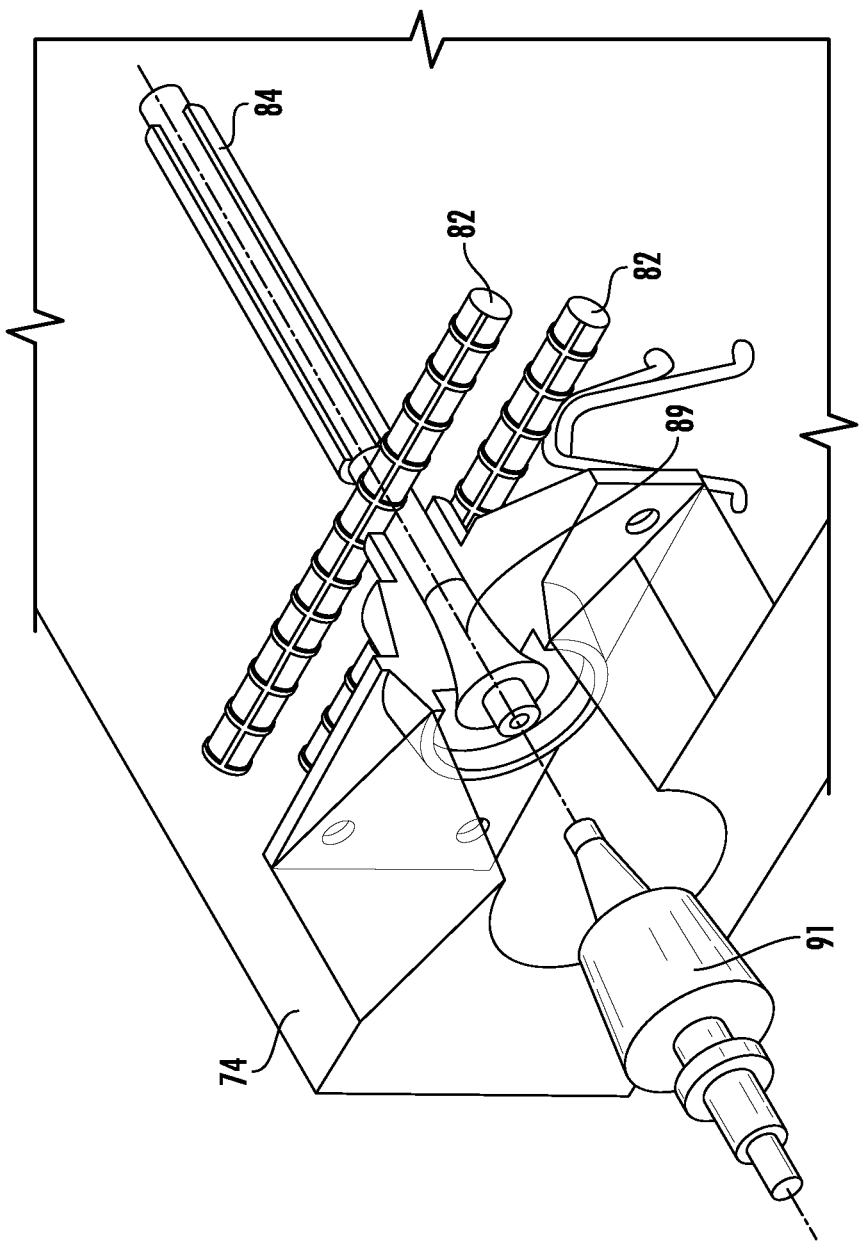
FIG. 6 is a perspective and partially cut-away view of a tensioning assembly according to one embodiment of the present invention.

The second end 72 of the string 61 is connected to a second anchor element 74. The second anchor element 74 is fixedly positioned near the root 33. The second anchor element 74 includes a tensioning assembly 80 as shown in FIG. 6. The tensioning assembly 80 includes at least one anchor rod 82 and a reinforcement tube 84. The anchor rods 82 are positioned between the tip 34 and a plate 86 that is connected to a first ferrule 89. The string 61 passes through the first ferrule 89 and the plate 86. The string 61 is captured by a tightening second ferrule 91. The tightening ferrule 91 includes a rod and a threaded member as known in the art configured to place the string 61 under tension by transferring compression into the plate 86 and through the reinforcement tube 84. In this manner, at least a portion of the blade 30 is put under compression.

According to the embodiment shown in FIG. 3 the tension element 60 can include a string 61 as shown. Typically the tension element 60 would include two or more parallel strings 61 running generally in the spanwise direction of the blade 30. The tension element 60 can be considered reinforcement. At the second end 72 near the root 33, or inboard end of the tension element 60, the second anchor element 74 is positioned. The second anchor element 74 is positioned such that it is oriented in a generally chordwise direction. The second anchor element 74 is can be metallic. The strings 61 may be anchored by known methods such as swaging, ferrules, etc. Thus anchor element 74 serves as a means for attaching the strings 61, spreading the load out in the composite material, and/or as tooling for applying pretension loads.

At the first end 62, or outboard end, the individual strings may be adhesive bonded/encapsulated with the composite material, or individual anchors such as devises or ferrules could be provided, or a similar chordwise anchor could be provided.

The reinforcement strings 61 are preloaded, meaning that they have a tensile load applied thereto that is transferred to the structure of the blade 30 (essentially applying compressive stress to the blade in the spanwise direction).

There are numerous benefits associated with pretension including, but not limited to, the following: absorbing shock load, increasing the overall tensile strength the blade, retaining fragments of the blade in the case of foreign object damage, and acting as an effective "fuse" in some configurations. Preload can be applied as either "pretensioning" or "post tensioning". As used herein the term "pretensioning" refers to the condition where tension is applied to element 60 prior to installation within the blade 30 or buildup of blade 30 around the tension elements 60. As used herein, the term "post tensioning" refers to the condition where tension is applied to element 60 after construction of the blade 30.

The present invention can be better understood through a description of the operation thereof. In the case of pretensioning, appropriate tooling, e.g. clamps (not shown), is provided to place the strings 61 under tension. The composite material is then infiltrated/molded around the reinforcement.

Figure 9:
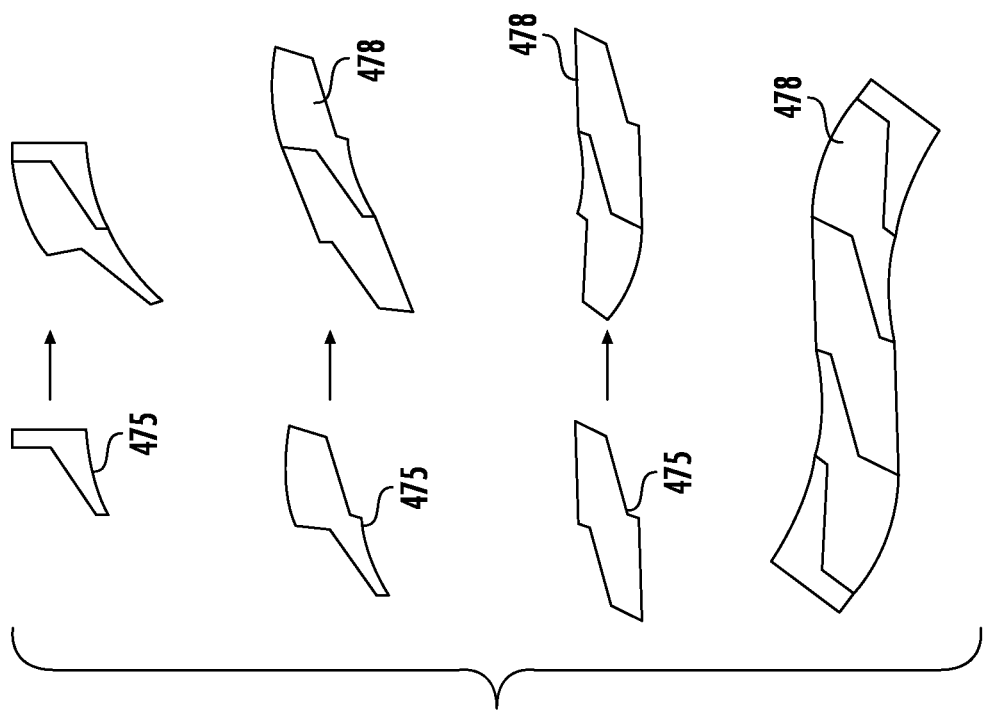
FIG. 9 is a view of various compression elements individually and in and a typical working combination.
Figure 8:
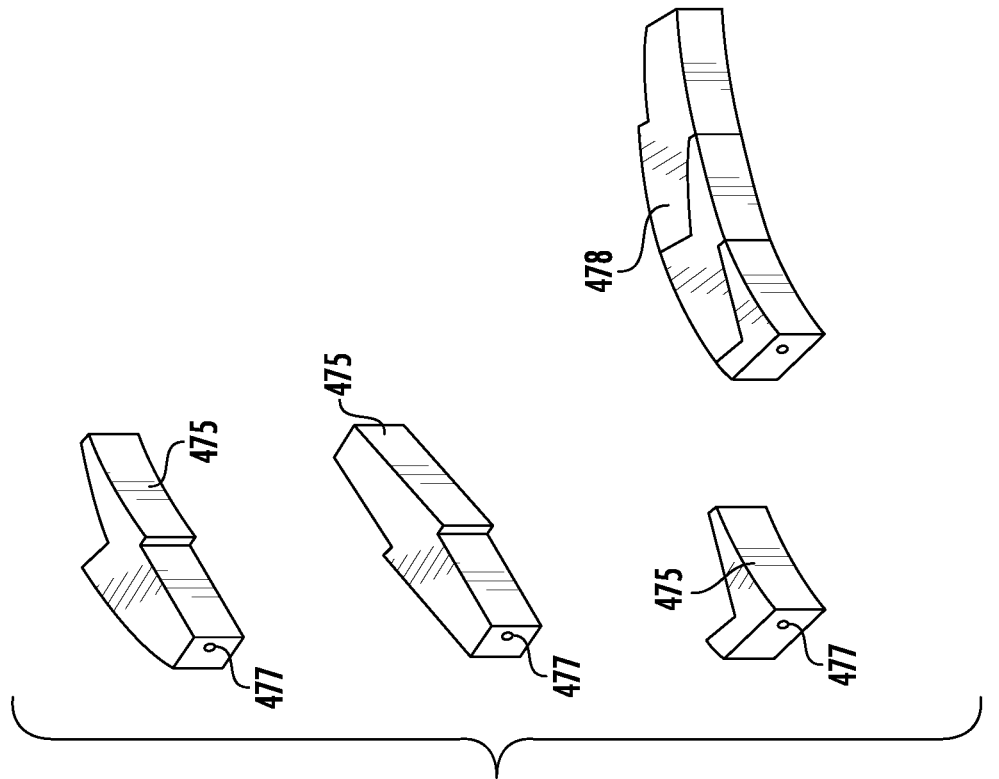
FIG. 8 is a view of compression elements in a working combination.
Figure 10:
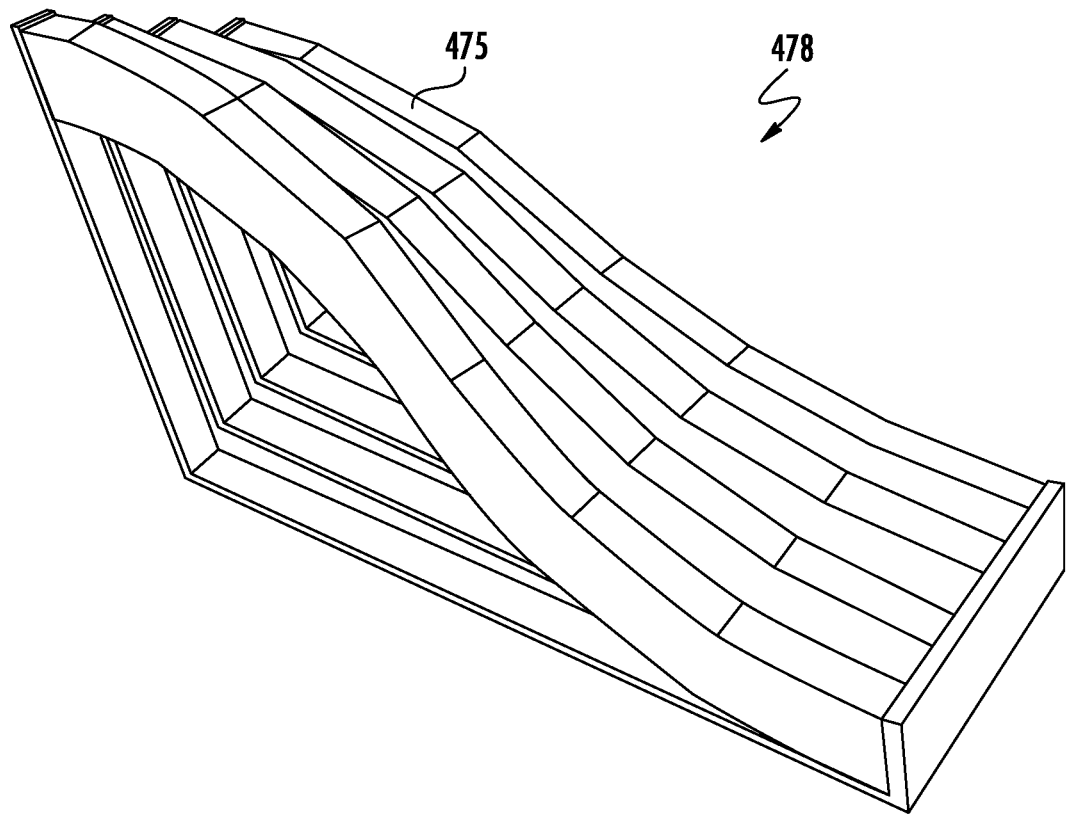
FIG. 10 is a view of compression elements and working combinations arranged to provide a predetermined profile.

In the case of post tensioning, appropriate tooling would be used to apply tensile load to the strings 61 after they are manufactured into the body 31 of the fan blade 30. In the case of post tensioning, there is a desire to avoid distortion of the basic shape of the blade. Compression blocks 475 are provided (shown in FIGS. 8 and 9). Blocks 475 are molded into the body of a blade. The blocks 475 are configured such that they are more rigid and have greater strength than surrounding composite material and have small bores 477 formed therethrough. The small bores 477 are configured to accept the strings 61. The blocks 475 are assembled into structures 478. The strings 61 are routed into the blocks 475 and through the structures 478. Subsequently, tension can be applied to the strings 61 without distortion of the body of the blade 30.

Figure 4:
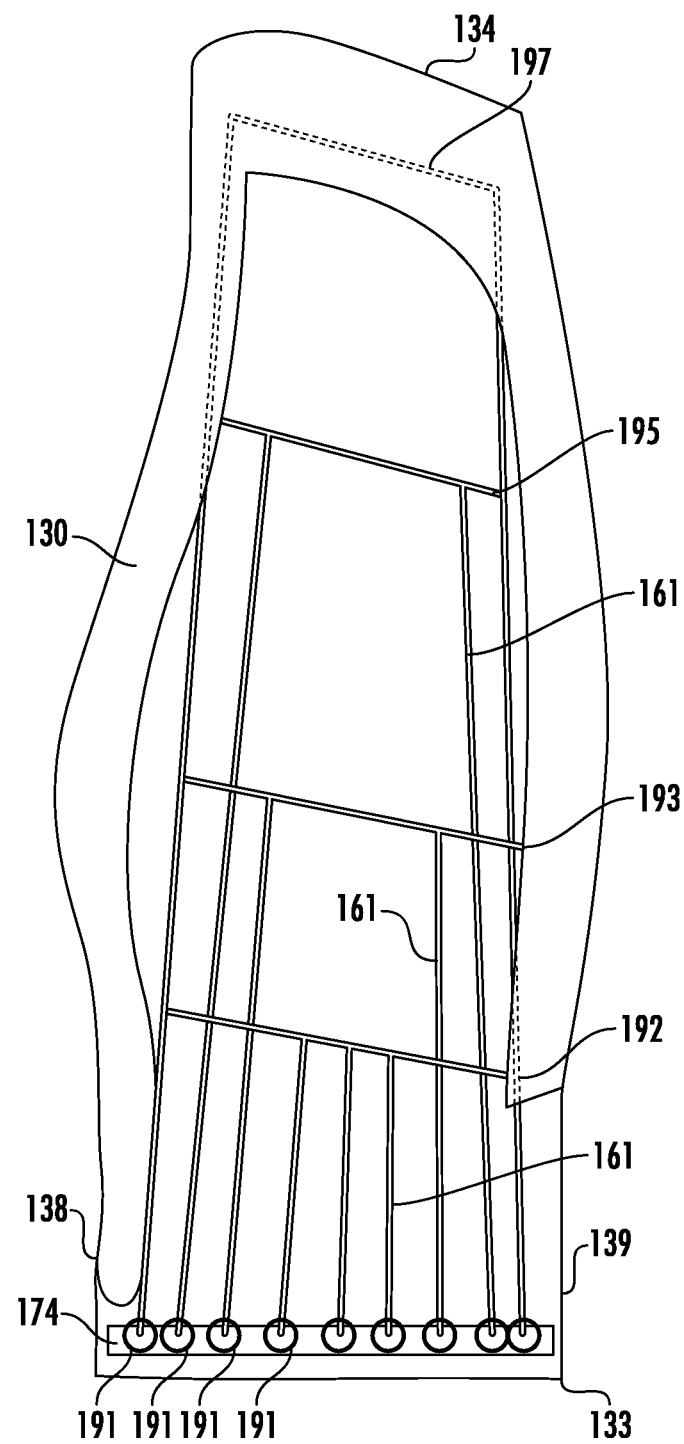
FIG. 4 is a partially cut-away perspective view of a fan blade according to another embodiment of the present invention.

Referring now to FIG. 4, there is illustrated an alternative embodiment that provides a configuration of tension strings that define spanwise zones. Please note that reference numbers within the 100 series can be understood from the description above of similar elements associated with reference numbers within the zero series. In this embodiment there is provided a blade 130 having a leading edge 138, a trailing edge 139, a root 133 and a tip 134. A plurality of tension strings 161 extend from an anchor element 174. Each of the tension strings is attached to the anchor element 174 via a tensioning ferrule 191. These tensioning ferrule 191 is configured such that the associated string 161 and receive a predetermined tension. Preferably, pairs of strings 161 are set at similar tensions in some embodiments, a first pair might have a first tension and a second pair have a second tension and the second tension is different than the first tension.

As shown in FIG. 4, selected strings 161 end at different positions such that they have different lengths. In this regard, the blade 131 includes multiple zone anchors positioned in various minimize locations spaced such that some are closer to tip 134 than others. The multiple anchor points include a first zone anchor 197 near the tip, a second zone anchor 195 positioned between the anchor 197 in the root 133, a third zone anchor 193 positioned between the anchor 195 and the root 133, and fourth zone anchor 192 positioned between the anchor 193 and the root 133.

It should be appreciated that the region of the blade 131 positioned between adjacent zone anchors such as first zone anchor 197 and second zone anchor 195 are compressed by the tension strings 161 that extend through that zone. It should be appreciated that strings attached to the first zone anchor 197 can be considered first strings, likewise strings attached to second zone anchor 195 can be considered second strings. As shown in FIG. 4, each zone has a different number of tension strings 161 extending therethrough. Thus the portion of blade the 131 and each zone has a different compression than the other portions of the blade 131. In this way, span-wise zones having different tensions and different resulting compressions are defined.

The first, second, third, and fourth zones can have different preloads to match the different expected loads on the blade 131. Furthermore they provide demarcations where the blade 131 can fail (release material) in small increments in the case of foreign object damage (rather than failing suddenly or being released as a whole unit).

Figure 5:
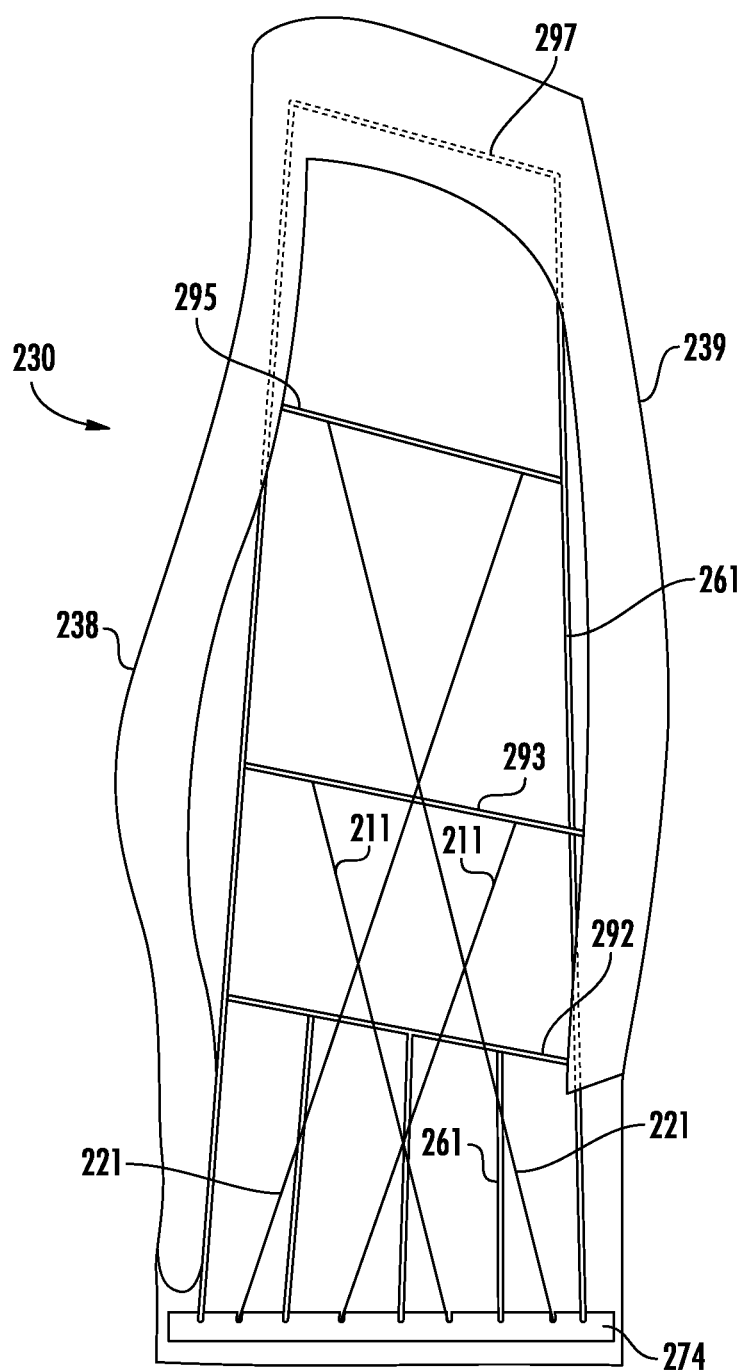
FIG. 5 is a partially cut-away perspective view of a fan blade according to yet another embodiment of the present invention.

Referring now to FIG. 5, there is shown another alternative embodiment in which the tension strings run at different angles. Please note that elements associated with reference numbers within the 200 series can be understood from the description above of similar elements associated with reference numbers within the zero series. In this embodiment there is provided, a blade 230 having a leading edge 238, a trailing edge 239, a root 233 and a tip 234. A plurality of tension strings 261 extend from an anchor element 274. Each of the tension strings 261 is attached to the anchor element 274 as described above. In accordance with this embodiment, tension strings 261 can be oriented at various angles relative to anchor 274 and to zone anchors 292, 293, 295, and 297.

Figure 7:
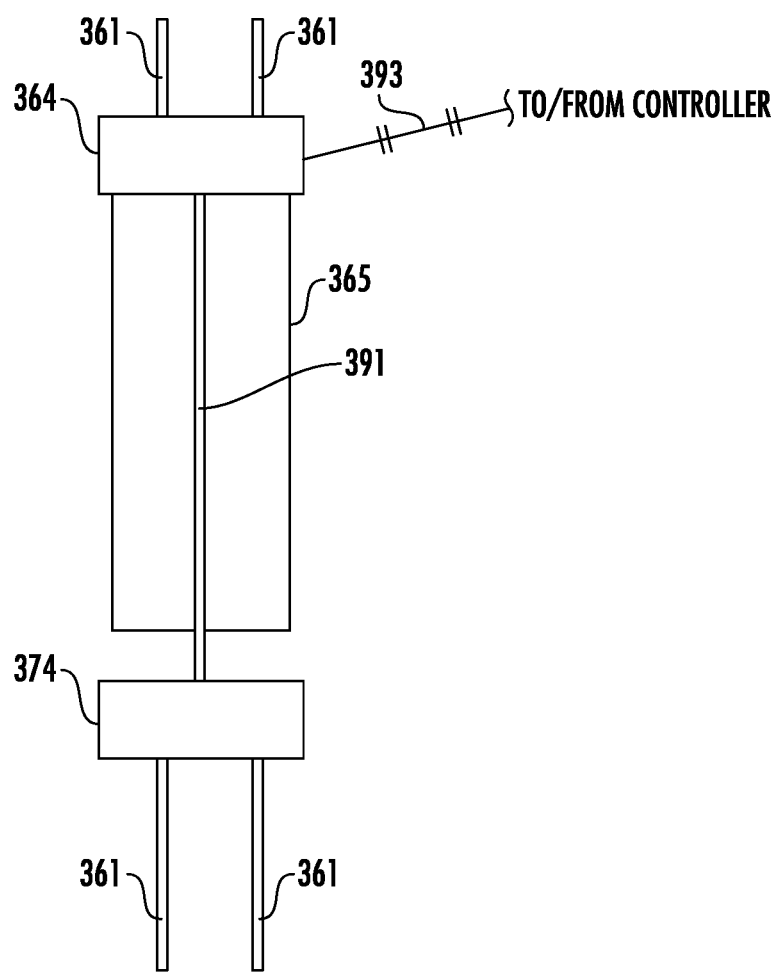
FIG. 7 is a schematic view of a portion of a tension assembly that includes a dynamic string.

Referring now to FIG. 7, there is illustrated another alternative embodiment in which the tension strings are configured to vary tension in response to a change in a signal such as a temperature change or a change in electrical property. In this manner, tension within the blade 30 can vary in response to changes in environmental conditions, such as temperature. Further, the blade 30 can be configured to change in tension in response to a signal such as an electrical signal provided by a computer. Thus tension in the blade 30 can be subject to closed loop control.

Please note that elements associated with reference numbers within the 300 series can be understood from the description above of similar elements associated with similar reference numbers within the zero series. A variable tension element 391 is provided and is attached between two anchor elements 364 and 374. A plurality of tension strings 361 are attached to the anchor elements 364 and 374 and extend to the tip and root respectively. A variable tension element 391 is attached between the anchor elements 364 and 374. The variable tension element extends through a cover tube 365.

The variable tension element 391 is configured such that the tension of variable tension element 391 changes when it is exposed to a change in a predetermined signal or input. As a result, this change in tension is transmitted to the strings 361 via the anchor elements 364 and 374 such that the tension of the strings 361 change. By way of example and not limitation, the input can be one of the following: temperature, an electrical property, electrical current, electrical voltage, and a combination thereof. The input can be communicated from a controller such as a central processor via electrical signal 393. It should be appreciated that data regarding tension in tension elements 361 attached to anchor element 364 can be measured via a suitable device such as a load cell at anchor element 364 and transmitted to a controller via electrical signal 393. In this way closed loop control of tension elements 361 can be implemented.

The foregoing has described an apparatus, i.e., a fan blade that includes a tension element that is configured to provide sufficient operating strength for normal operating conditions, and to retain fragments through severe failure. The advantage of a fan blade that is configured to be pretension or posttensioned is that the blade can be lighter and stronger than conventional blades.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not limited to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A blade for a propulsion apparatus, comprising:
    a body formed of a composite material and the body having opposed pressure and suction sides, and extending in span between a root and a tip, and extending in chord between a leading edge and a trailing edge;
    a void defined within the body and positioned between the root and the tip and a tension element positioned within the void; and
    wherein the tension element includes a first string that is configured to be under a first tension and a second string that is configured to be under a second tension such that at least a portion of the blade between the root and the tip is under compression.

2. The blade for a propulsion apparatus according to claim 1, wherein the first tension is greater than the second tension.

3. The blade for a propulsion apparatus according to claim 1, wherein the first tension is substantially equal to the second tension.

4. The blade for a propulsion apparatus according to claim 1, wherein a first zone including a first plurality of strings is positioned within the blade body and a second zone including a second plurality of strings is positioned within the blade body and the first string is positioned in the first zone and the second string is positioned in the second zone wherein the first plurality of strings each are under substantially the same tension as the first string and the second plurality of strings each are under substantially the same tension has the second string.

5. The blade for a propulsion apparatus according to claim 4, wherein the first zone is positioned between the root and the second zone.

6. The blade for a propulsion apparatus according to claim 5, wherein the first tension is greater than the second tension.

7. The blade for a propulsion apparatus according to claim 4, wherein the first zone and the second zone and positioned the same distance from the root and are side-by-side in span.

8. The blade for a propulsion apparatus according to claim 7, wherein a third zone that includes a third plurality of strings is positioned outboard of the first zone and the second zone and the third plurality of strings are under a third tension that is different than the first tension and the second a tension.

9. The blade for a propulsion apparatus according to claim 1, wherein the second string is configured such that the second tension has a first value in response to an input and a second value in response to a change in the input.

10. The blade for a propulsion apparatus according claim 9, wherein the input is one of the following: temperature and an electrical property.

11. A gas turbine engine apparatus, comprising:
a turbomachinery core;
a fan coupled in driven relationship with the turbomachinery core, the fan including:
a plurality of blades positioned around a disk, each blade including:
an airfoil body comprising composite materials and having opposed pressure and suction sides, and extending in span between a root and a tip, and extending in chord between a leading edge and a trailing edge;
the airfoil body being formed of a composite material and defining a void;
a tension element positioned within the void and extending between near the root and near the tip; and
wherein the tension element includes a first string that is configured to be under a first tension and a second string that is configured to be under a second tension such that at least a portion of the blade between the root and the tip is under compression.

12. The blade for a propulsion apparatus according to claim 11, wherein the first tension is greater than the second tension.

13. The blade for a propulsion apparatus according to claim 11, wherein the first tension is substantially equal to the second tension.

14. The blade for a propulsion apparatus according to claim 11, wherein a first zone including a first plurality of strings is positioned within the blade body and a second zone including a second plurality of strings is positioned within the blade body and the first string is positioned in the first zone and the second string is positioned in the second zone wherein the first plurality of strings each are under substantially the same tension as the first string and the second plurality of strings each are under substantially the same tension has the second string.

15. The blade for a propulsion apparatus according to claim 14, wherein the first zone is positioned between the root and the second zone.

16. The blade for a propulsion apparatus according to claim 15, wherein the first tension is greater than the second tension.

17. The blade for a propulsion apparatus according to claim 11, wherein the second string is configured such that the second tension has a first value in response to an input and a second value in response to a change in the input and this change causes a change in the first tension.

18. The blade for a propulsion apparatus according to claim 17, wherein the input is one of the following: temperature and electrical current.

* * * * *